(12) United States Patent
Park et al.

(10) Patent No.: US 8,750,553 B2
(45) Date of Patent: Jun. 10, 2014

(54) SPEAKER DEVICE FOR MOBILE TERMINAL

(75) Inventors: Gun Hee Park, Suwon-si (KR); Byung Hwa Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 12/802,909

(22) Filed: Jun. 16, 2010

(65) Prior Publication Data

US 2010/0322456 A1 Dec. 23, 2010

(30) Foreign Application Priority Data

Jun. 17, 2009 (KR) .................. 10-2009-0053679

(51) Int. Cl.
*H04R 1/02* (2006.01)
*H04R 9/06* (2006.01)
*H01Q 1/24* (2006.01)
*H04B 1/38* (2006.01)

(52) U.S. Cl.
USPC ........... 381/387; 381/334; 343/702; 455/90.3

(58) Field of Classification Search
USPC ........ 381/387, 334; 343/702; 455/575.7, 90.3
See application file for complete search history.

(56) References Cited

U.S. PATENT DOCUMENTS

| 5,790,679 A * | 8/1998 | Hawker et al. ............... 381/163 |
| 6,201,501 B1 * | 3/2001 | Arkko et al. .................. 343/702 |
| 6,411,719 B1 * | 6/2002 | Moster et al. ................. 381/345 |
| 6,819,946 B2 * | 11/2004 | Hansson ....................... 455/569.1 |
| 6,834,181 B2 * | 12/2004 | Kaikuranta et al. .......... 455/90.3 |
| 6,922,471 B1 * | 7/2005 | Marqvardsen et al. .. 379/433.02 |
| 6,995,715 B2 * | 2/2006 | Ying et al. .................... 343/702 |
| 7,107,016 B2 * | 9/2006 | Dufosse et al. ............... 455/90.1 |
| 7,123,734 B2 * | 10/2006 | Voth et al. ..................... 381/334 |
| 7,136,625 B2 * | 11/2006 | Ylitalo et al. ................. 455/90.3 |
| 7,167,130 B2 * | 1/2007 | Hayes ........................... 343/702 |
| 7,233,678 B2 * | 6/2007 | Erixon et al. ................. 381/345 |
| 7,369,673 B2 * | 5/2008 | Matsumoto et al. .......... 381/386 |
| 7,796,773 B2 * | 9/2010 | Klein ............................. 381/351 |
| 2002/0160725 A1 * | 10/2002 | Toyoda et al. ................. 455/90 |
| 2004/0142731 A1 * | 7/2004 | Ho et al. ....................... 455/569.1 |
| 2004/0170291 A1 * | 9/2004 | Eaton ............................ 381/334 |
| 2005/0153727 A1 * | 7/2005 | Li .................................. 455/550.1 |
| 2005/0205350 A1 * | 9/2005 | Yang ............................. 181/160 |
| 2007/0275769 A1 * | 11/2007 | Ho et al. ....................... 455/569.1 |
| 2009/0128423 A1 * | 5/2009 | Mori .............................. 343/702 |
| 2010/0203929 A1 * | 8/2010 | Skagmo et al. ............... 455/575.1 |
| 2010/0331058 A1 * | 12/2010 | Qingshan et al. ............. 455/575.1 |

* cited by examiner

*Primary Examiner* — David Warren
*Assistant Examiner* — Christina Russell

(57) ABSTRACT

A speaker device for a mobile terminal enlarges resonance space of a speaker while decreasing a size of the mobile terminal. The speaker device for a mobile terminal includes at least one speaker installed within a main body of the mobile terminal and a speaker bracket installed at one surface of an electronic circuit board mounted within the main body. In addition, the speaker bracket fixes the at least one speaker in place and has housing space to enclose the at least one speaker therein. At least one resonance groove is formed in a portion enclosed by the speaker bracket in one surface of the electronic circuit board. Because resonance space can be enlarged without increasing a size of the speaker bracket, an entire thickness of the mobile terminal can be reduced and thus a size and thickness of the mobile terminal can be decreased.

20 Claims, 3 Drawing Sheets

SPEAKER DEVICE FOR MOBILE TERMINAL

CROSS-REFERENCE TO RELATED APPLICATION(S) AND CLAIM OF PRIORITY

The present application is related to and claims the benefit under 35 U S. C. §119 a of a Korean patent application filed in the Korean Intellectual Property Office on Jun. 17, 2009 and assigned Serial No. 10-2009-0053679, and the entire disclosure of which is hereby incorporated by reference.

TECHNICAL FIELD OF THE INVENTION

The present invention relates to a mobile terminal, and more particularly, to a speaker device for a mobile terminal that can enlarge resonance space of a speaker while decreasing a size of the mobile terminal.

BACKGROUND OF THE INVENTION

In general, a mobile terminal is an electronic device that can enable a user to perform a function such as wireless communication, network connection, and digital broadcasting reception almost regardless of time and location. A recent mobile terminal has been developed to perform a function such as Internet connection and digital broadcasting reception as well as a communication function. Further, a function such as document writing and game playing is added to the mobile terminal. As a function of the mobile terminal gradually improves, accessories for various conveniences are installed, and as a size of the mobile terminal decreases, many accessories are densely disposed due to restriction in internal space of the mobile terminal.

Particularly, nowadays, as a multimedia function of the mobile terminal is enhanced, a speaker device for outputting sound is important, and thus the speaker device should essentially have resonance space for generating sound in a speaker. Resonance space is space for reinforcing and resounding sound generated in the speaker, and in order to for a user to obtain desired sound of high quality, a minimum resonance space should be secured.

In order to decrease a size and thickness of a mobile terminal, a thickness of the mobile terminal is reduced. However, when the thickness of the mobile terminal is reduced, necessary resonance space within a speaker device decreases, weakening the medium and low frequency bands of sound generated in the speaker; therefore, sound effect and a communication quality of the mobile terminal are deteriorated. Further, in order to provide resonance space to solve such a problem, there is a problem that an entire thickness of the mobile terminal becomes thick and only an installation portion of the speaker device protrudes to the outside.

Therefore, even while decreasing a size of the mobile terminal, a speaker device for the mobile terminal that can enlarge resonance space of a speaker is needed.

SUMMARY OF THE INVENTION

To address the above-discussed deficiencies of the prior art, it is a primary object to provide a speaker device for a mobile terminal that can enlarge resonance space without increasing a size of a speaker bracket in which a speaker is installed.

In accordance with an aspect of the present invention, a speaker device for a mobile terminal includes at least one speaker installed within a main body of the mobile terminal and a speaker bracket installed at one surface of an electronic circuit board mounted within the main body. The speaker bracket is configured to fix the at least one speaker in place and includes housing space for enclosing the at least one speaker therein. At least one resonance groove is formed in a portion enclosed by the speaker bracket in the one surface of the electronic circuit board.

In accordance with another aspect of the present invention, a mobile terminal includes a main body that includes an electronic circuit board therein and a speaker device including at least one speaker installed within the main body. A speaker bracket is configured to fix the at least one speaker in place and includes housing space enclosing the at least one speaker therein. The speaker bracket is installed at one surface of the electronic circuit board, and at least one resonance groove is formed in a portion enclosed by the speaker bracket at the one surface of the electronic circuit board.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
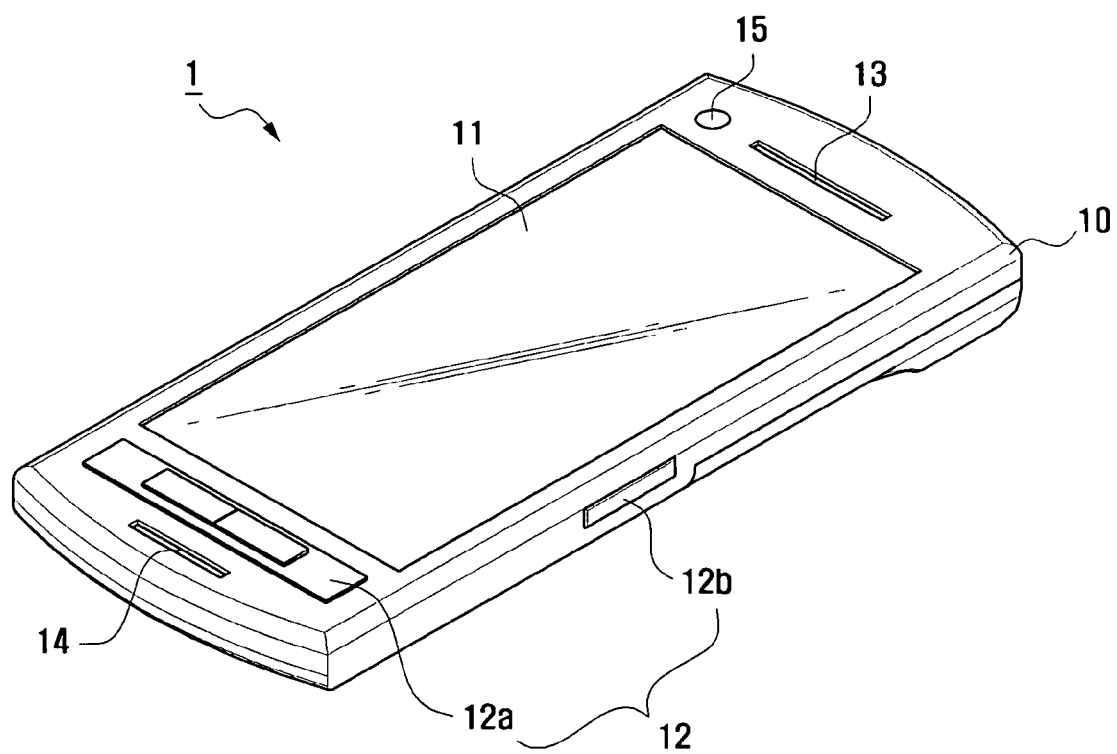
FIG. 1 illustrates a configuration of a mobile terminal according to an embodiment of the present invention.
Figure 2:
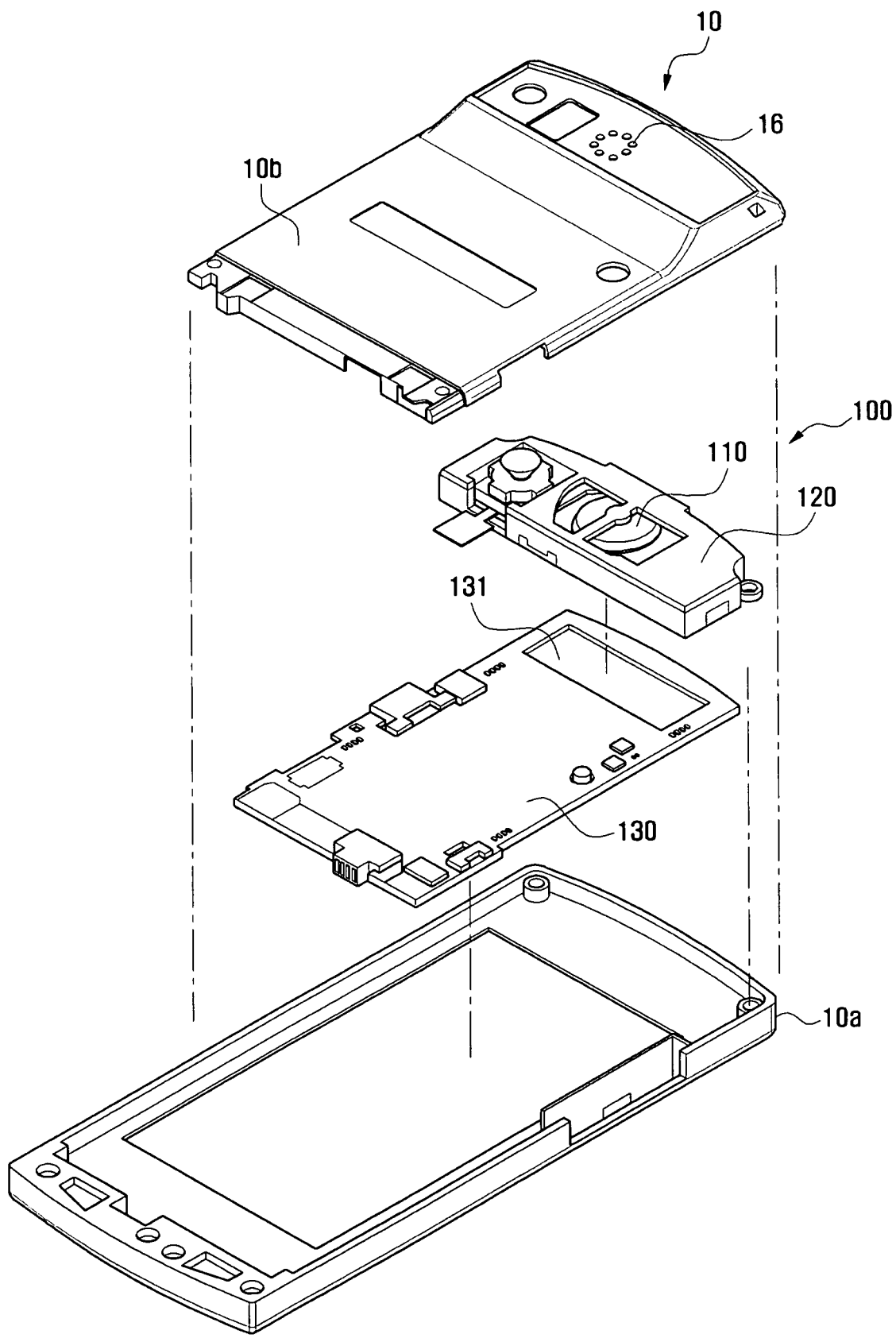
FIG. 2 illustrates a structure of a speaker device for the mobile terminal of FIG. 1.
Figure 3:
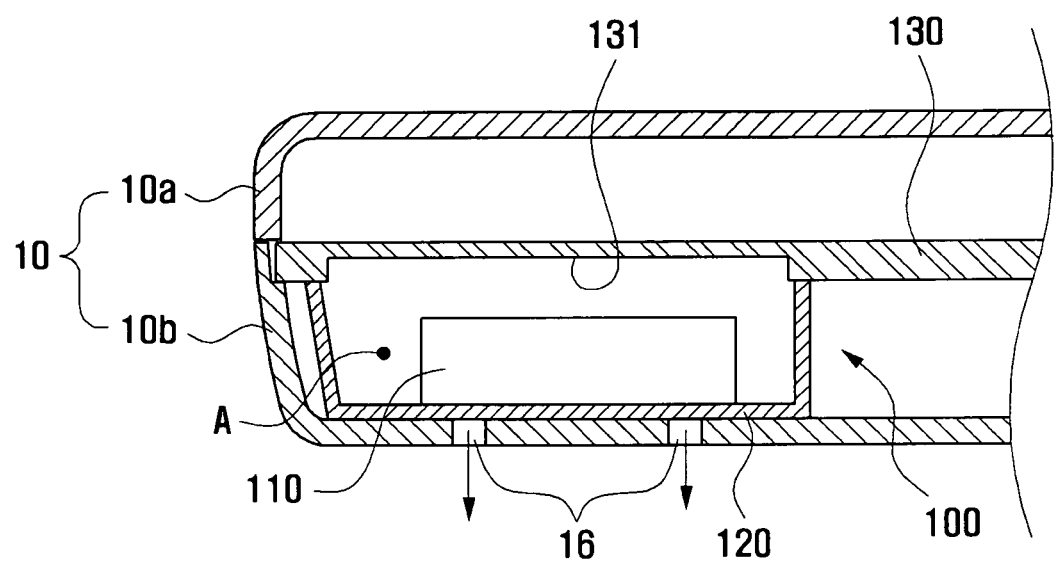
FIG. 3 illustrates a structure of a speaker device for the mobile terminal of FIG. 1.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal. The views in the drawings are schematic views only, and are not intended to be to scale or correctly proportioned. Detailed descriptions of well-known functions and structures incorporated herein may be omitted to avoid obscuring the subject matter of the present invention.

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

In the following description, a mobile terminal according to the present invention is a mobile communication terminal such as a mobile phone. However, the present invention is not limited thereto and may be an information and communication device or a multimedia device such as a mobile communication terminal, mobile phone, personal digital assistant (PDA), smart phone, International Mobile Telecommunication 2000 (IMT-2000) terminal, code division multiple access (CDMA) terminal, wideband code division multiple access (WCDMA) terminal, Global System for Mobile Communication (GSM) terminal, general packet radio service (GPRS) terminal, enhanced data GSM environment (EDGE) terminal, universal mobile telecommunication service (UMTS) terminal, digital broadcasting terminal, and applications thereof.

FIG. 1 illustrates a configuration of a mobile terminal according to an exemplary embodiment of the present invention. In FIG. 1, a bar type mobile terminal 1 is shown, among various forms, for illustrative purposes only.

Referring to FIG. 1, a general bar type mobile terminal 1 includes a main body 10, display unit 11, key input unit 12, sound output unit 13, sound input unit 14, and camera unit 15.

The display unit 11 performs a function of a user interface for outputting a desired screen to a user or for receiving an instruction from a user. The display unit 11 can be formed as a liquid crystal display (LCD) or an organic light emitting diode (OLED). It is preferable that the display unit 11 is formed to have a function of a touch screen in order to receive an instruction from the user.

The key input unit 12 for receiving a manipulation instruction from the user is formed at an upper surface or a side surface of the main body 10. When the display unit 11 has a function of a touch screen, the key input unit 12 is formed with minimum function keys such as a power key for turning the power of the mobile terminal 1 on or off, communication key for performing communication with another party, and navigation key for selecting menus displayed on the display unit 11. The key input unit 12 is formed in a form of a keypad or a key button. FIG. 1 illustrates an example in which a first key input unit 12a is formed in a lower end portion of the main body 10, i.e. a lower end portion of the display unit 11 and in which a second key input unit 12b is formed in a side surface of the main body 10; however, the present invention is not limited thereto. The key input unit 12 may be omitted, and an entire upper surface of the main body 10 can be formed as the display unit 11.

As shown in FIG. 1, the mobile terminal 1 includes the sound output unit 13 provided in an upper end portion of the main body 10 to output a sound signal and the sound input unit 14 provided in a lower end portion of the main body 10 to input a sound signal. The sound output unit 13 outputs a sound signal related to a function according to an operational state of the mobile terminal 1 such as a call signal reception state and a communication state. The sound output unit 13 can be formed as a speaker device including at least one speaker. This is described in detail with reference to FIGS. 2 and 3. The sound input unit 14 receives an external sound signal using a microphone according to an operational state of the mobile terminal 1, such as a communication state and a recording state, and processes the external sound signal as electrical sound data. The mobile terminal 1 has a camera unit 15 for photographing a front subject or performing audiovisual communication in an upper end portion of the main body 10.

Although not shown, the mobile terminal 1 has an antenna unit for transmitting and receiving a wireless signal. The antenna unit may be located within a lower end portion of the main body 10 due to a restriction in internal space according to decrease in size of the mobile terminal 1.

FIG. 1 illustrates a bar type mobile terminal 1, however the present invention is not limited thereto and can be applied to mobile terminals of various types such as a slide type, flip type, folder type, and rotation type.

The speaker device 100 constituting the sound output unit 13 is described hereinafter with reference to FIGS. 2 and 3.

FIG. 2 is an exploded perspective view illustrating a structure of a speaker device for the mobile terminal 1 of FIG. 1, and FIG. 3 is a cross-sectional view illustrating a structure of a speaker device for the mobile terminal 1 of FIG. 1.

Referring to FIG. 2, the speaker device 100 includes a speaker 110 installed within the main body 10 of the mobile terminal 1, speaker bracket 120 that fixes the speaker 110 to the inside of the main body 10, and an electronic circuit board 130 to which the speaker bracket 120 is coupled. At least one speaker 110 is provided in the speaker device 100 and is fixed to the inside of the speaker bracket 120.

The speaker bracket 120 is formed in a thin rectangular shape that includes an approximately rectangular section and an empty inner housing space to enclose the speaker 110 in order to provide resonance space for sound generated from the speaker 110. The speaker bracket 120 may provide space for a camera unit or an antenna unit in addition to the speaker 110. The speaker bracket 120 is coupled to one surface of the electronic circuit board 130 that is mounted within the main body 10.

The electronic circuit board 130 is mounted within the main body 10 of the mobile terminal 1, i.e. between front cover 10a and a rear cover 10b of the main body 10. The display unit 11 is located at the front cover 10a, and the rear cover 10b is coupled to the front cover 10a with the electronic circuit board 130 interposed therebetween. Various function modules such as the display unit 11, key input unit 12, sound output unit 13, sound input unit 14, and camera unit 15 constituting the mobile terminal 1 are electrically coupled to the electronic circuit board 130 and receive a control signal from the electronic circuit board 130. The electronic circuit board 130 has a thin plate shape and includes various electronic components and wires for connections at an upper surface or a lower surface thereof. The electronic components may be various kinds of elements such as a modem chip. Preferably, the electronic circuit board 130 is formed as a printed circuit board (PCB).

As shown in FIG. 2, the speaker bracket 120 may be installed at a position adjacent to an upper end portion of the main body 10. In one some embodiments, the speaker bracket 120 provides resonance space using a structure that is open on some of an installation portion of the speaker 110 and blocked at an opposite side of the installation portion of the speaker 110 with the electronic circuit board 130. As shown in FIG. 3, one surface of the speaker bracket 120 that faces in the opposite direction from the electronic circuit board 130 is opened. In some embodiments, a contact portion of the speaker bracket 120 and the electronic circuit board 130 can be shielded to maximize resonance effect.

Preferably, the speaker bracket 120 is installed between the rear cover 10b and the electronic circuit board 130. In an embodiment, as shown in FIG. 3, sound generated from the speaker 110 is resonated in resonance space and is transferred outside through a speaker hole 16 formed in an upper end portion of the rear cover 10b. FIGS. 2 and 3 illustrate an embodiment in which the speaker bracket 120 is installed between the rear cover 10b and the electronic circuit board 130. In another embodiment, the speaker bracket 120 may be installed between the front cover 10a and the electronic circuit board 130. In this embodiment, sound generated from the speaker 110 is resonated in resonance space and is transferred outside through the speaker hole 16 formed in an upper end portion of the front cover 10a.

In the speaker device 100 for the mobile terminal according to the present exemplary embodiment, at least one resonance groove 131 for enlarging resonance space is formed in a portion enclosed by the speaker bracket 120 in one surface of the electronic circuit board 130 around which the speaker bracket 120 and the electronic circuit board 130 are coupled. In general, resonance space of the speaker 110 depends on a volume of space enclosed by the speaker bracket 120 and the electronic circuit board 130, and as shown in FIG. 3, resonance space A enclosed by the speaker bracket 120 and the electronic circuit board 130 can be enlarged by forming the resonance groove 131 in a portion enclosed by the speaker bracket 120 in one surface of the electronic circuit board 130 around which the speaker bracket 120 and the electronic circuit board 130 come into contact. The resonance groove 131 is formed by making the electronic circuit board 130 thin in a portion enclosed by the speaker bracket 120 with respect to the rest of the electronic circuit board 130.

FIG. 3 illustrates an example in which the resonance groove 131 is formed in the same size as that of the speaker bracket 120, however the quantity and a size of the resonance groove 131 can be changed according to the quantity and disposition of the speaker 110, a size of the speaker bracket 120, and a disposition form of electronic components provided in the electronic circuit board 130.

As described above, in a speaker device 100 for a mobile terminal according to the present exemplary embodiment, by forming the resonance groove 131 in a contact portion of the speaker bracket 120 and the electronic circuit board 130, resonance space of the speaker 110 can be enlarged. Further, even while enlarged resonance space is provided, it is unnecessary to increase a size of the speaker bracket 120 and thus an entire thickness of the mobile terminal 1 can be reduced.

In an embodiment of the present invention, a speaker device for a mobile terminal is exemplified. However, by reducing a thickness of an electronic circuit board in an installation portion of a configuration module, for example, an antenna device or a camera unit mounted in the electronic circuit board in addition to the speaker device, necessary space is secured, thereby reducing a thickness of an entire mobile terminal.

As described above, according to a speaker device for a mobile terminal of the present invention, by forming a resonance groove in a contact portion of a speaker bracket in which a speaker is installed and an electronic circuit board, resonance space of the speaker can be enlarged.

Further, because resonance space can be enlarged without increasing a size of the speaker bracket, an entire thickness of the mobile terminal can be reduced and thus a size and thickness of the mobile terminal can be decreased.

Further, a slim type mobile terminal that can provide abundant sound of a high quality to a user can be provided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A speaker device comprising:
an electronic circuit board mounted within a main body of a terminal;
a speaker bracket on one surface of the electronic circuit board comprising housing space; and
at least one speaker fixed to the speaker bracket and enclosed by the housing space,
wherein a first portion of the electronic circuit board enclosed by the speaker bracket on the one surface of the electronic circuit board is configured to have a non-zero thickness thinner than a thickness of a second portion of the electronic circuit board to enlarge the housing space in which the speaker is enclosed.

2. The speaker device of claim 1, wherein the main body comprises a front cover in which a display unit is installed and a rear cover coupled to the front cover at a back side of the front cover, and wherein the speaker bracket is installed between the rear cover and the electronic circuit board.

3. The speaker device of claim 1, wherein one surface of the speaker bracket opposite to the electronic circuit board comprises at least one hole.

4. The speaker device of claim 1, wherein a contact portion of the speaker bracket and the electronic circuit board is shielded.

5. The speaker device of claim 1, further comprising a resonance space enclosed by the speaker bracket and the first portion of the electronic circuit board enclosed by the speaker bracket on the one surface of the electronic circuit board.

6. The speaker device of claim 5, wherein the speaker bracket provides the resonance space via a structure that is open on some of an installation portion of the at least one speaker and blocked at an opposite side of the installation portion of the at least one speaker with the electronic circuit board.

7. The speaker device of claim 1, wherein the electronic circuit board comprises a printed circuit board (PCB).

8. The speaker device of claim 1, wherein the main body further comprises a camera unit on one of the front cover and the rear cover.

9. The speaker device of claim 1, wherein the main body further comprises an antenna unit within the main body.

10. The speaker device of claim 1, wherein a quantity and a size of the first portion of the electronic circuit board enclosed by the speaker bracket on the one surface of the electronic circuit board is based according to a quantity of the at least one speaker, a disposition of the speaker, and a size of the speaker bracket.

11. A terminal comprising:
a main body comprising an electronic circuit board configured inside; and
a speaker device comprising a speaker bracket coupled to one surface of the electronic circuit board and comprising housing space and at least one speaker fixed to the speaker bracket and enclosed by the housing space,
wherein a first portion of the electronic circuit board enclosed by the speaker bracket on the one surface of the electronic circuit board is configured to have a non-zero thickness thinner than a thickness of a second portion of the electronic circuit board to enlarge the housing space in which the speaker is enclosed.

12. The terminal of claim 11, wherein the main body comprises a front cover in which a display unit is installed and a rear cover coupled to the front cover at a back side of the front cover, and wherein the speaker bracket is installed between the rear cover and the electronic circuit board.

13. The terminal of claim 11, wherein one surface of the speaker bracket opposite to the electronic circuit board comprises at least one hole.

14. The terminal of claim 11, wherein a contact portion of the speaker bracket and the electronic circuit board is shielded.

15. The terminal of claim 11, further comprising a resonance space enclosed by the speaker bracket and the first portion of the electronic circuit board enclosed by the speaker bracket on the one surface of the electronic circuit board.

16. The terminal of claim 15, wherein the speaker bracket provides the resonance space via a structure that is open on some of an installation portion of the at least one speaker and blocked at an opposite side of the installation portion of the at least one speaker with the electronic circuit board.

17. The terminal of claim 11, wherein the electronic circuit board comprises a printed circuit board (PCB).

18. The terminal of claim 11, further comprising a camera unit on one of the front cover and the rear cover.

19. The terminal of claim 11, further comprising an antenna unit within the main body.

20. The terminal of claim 11, wherein a quantity and a size of the first portion of the electronic circuit board enclosed by the speaker bracket on the one surface of the electronic circuit board is based according to a quantity of the at least one speaker, a disposition of the speaker, and a size of the speaker bracket.

* * * * *